US009602988B1

(12) United States Patent
Hajdu et al.

(10) Patent No.: US 9,602,988 B1
(45) Date of Patent: *Mar. 21, 2017

(54) PERIPHERAL SPECIFIC SELECTION OF AUTOMATED RESPONSE MESSAGES

(71) Applicants: Loralee Hajdu, North Vancouver (CA); Oliver Hajdu, North Vancouver (CA)

(72) Inventors: Loralee Hajdu, North Vancouver (CA); Oliver Hajdu, North Vancouver (CA)

(*) Notice: Subject to any disclaimer, the term of this patent is extended or adjusted under 35 U.S.C. 154(b) by 0 days.

This patent is subject to a terminal disclaimer.

(21) Appl. No.: 15/249,372

(22) Filed: Aug. 27, 2016

Related U.S. Application Data

(63) Continuation-in-part of application No. 14/273,748, filed on May 9, 2014, now Pat. No. 9,432,499.

(60) Provisional application No. 61/825,017, filed on May 18, 2013.

(51) Int. Cl.
*H04W 4/00* (2009.01)
*H04W 4/14* (2009.01)
*H04M 1/725* (2006.01)
*H04L 12/58* (2006.01)

(52) U.S. Cl.
CPC ............. *H04W 4/14* (2013.01); *H04L 51/02* (2013.01); *H04M 1/72552* (2013.01)

(58) Field of Classification Search
CPC .......... H04M 1/72552; H04M 1/7253; H04M 4/008; H04M 1/64
USPC ......................................... 455/466; 370/338
See application file for complete search history.

(56) References Cited

U.S. PATENT DOCUMENTS

2010/0216509 A1* 8/2010 Riemer ............. H04M 1/72577
455/557
2014/0066053 A1* 3/2014 Burke ..................... H04W 4/00
455/426.1

* cited by examiner

*Primary Examiner* — Marcos Batista
(74) *Attorney, Agent, or Firm* — Stephen E. Zweig

(57) ABSTRACT

Software and computer processor implemented system and method of providing customized automated responses to different types of incoming electronic messages from various contact sources, particularly useful for preventing distracted driving. Here the invention's software, often in the form of an app, runs on a smartphone or other computerized device configured to automatically connect to various peripherals, such as automobile associated Bluetooth peripherals. When operating, the app causes connected peripherals to automatically trigger auto response mode in response to incoming messages. Optionally, different automated responses to be assigned to different peripheral identification codes or different incoming message originators. Various prioritization schemes, such as last peripheral connected dominates, and various ways in which different contact specific automated responses may interact with various peripheral specific automated responses, are also discussed.

20 Claims, 10 Drawing Sheets

PERIPHERAL SPECIFIC SELECTION OF AUTOMATED RESPONSE MESSAGES

CROSS REFERENCE TO RELATED APPLICATIONS

This application is a continuation in part of application Ser. No. 14/273,748, "PERIPHERAL SPECIFIC SELECTION OF AUTOMATED RESPONSE MESSAGES", filed May 9, 2014, now U.S. Pat. No. 9,432,499 issued Aug. 30, 2016; application Ser. No. 14/273,748 claimed the priority benefit of U.S. provisional patent 61/825,017 "PERIPHERAL SPECIFIC SELECTION OF AUTOMATED RESPONSE MESSAGES", inventors Loralee Hajdu and Oliver Hajdu, filed May 18, 2013, the entire contents of all of these applications are incorporated herein by reference.

BACKGROUND OF THE INVENTION

Field of the Invention

This invention is in the field of automated telephone, email, and SMS message response schemes for communications network connected computerized systems and devices, such as smartphones, which also have an ability to connect by either wired or wireless links to one or more peripherals.

Description of the Related Art

Since the invention of the first telephone answering machine, electronic systems that produce automated response messages to various incoming telephone calls, email, text messages, and other forms of electronic communication have become common.

Such automated response systems are particularly useful for smartphones or other handheld computerized devices that are also connected to various communications networks (e.g. cellular networks, Internet, telephone lines, and the like). This is particularly important because often incoming messages may come at an inconvenient time, such as while the smartphone user is driving, in a conference, trying to get some quiet personal time, or other situation.

As smartphones have proliferated, distracted driving has become a major safety problem. As an example, On Apr. 3, 2014, Alessandra Malito of NBC News reported on a US Department of Transportation study that found that in 2012, more than 3,000 people were killed in accidents from distractions, and about 421,000 people were injured. Anthony Foxx, secretary of transportation in fact stated that: "Texting and cell phone use behind the wheel significantly increases a driver's risk of crashing," and "Even a single, momentary distraction while driving can cause a lifetime of devastating consequences." Indeed, the US government has set up a website, Distraction.gov, just to raise awareness of this problem. This site states that 71% of teens and young adults have composed/sent SMS messages while driving, and that 78% of teens and young adults have read an SMS message while driving.

Although states and countries have responded by passing various types of no-texting while driving laws, these laws are difficult to enforce because often texting while driving is invisible to outside viewers.

Thus improved methods to discourage texting while driving would save many lives, and improve public safety.

BRIEF SUMMARY OF THE INVENTION

The invention is based, in part, on the insight that prior art automatic answering or response systems are suboptimal in that they do not allow users enough flexibility to program in a variety of different automatic response messages in advance. Prior art automatic response systems also did not apply an optimal amount of intelligence in determining under which situations different automatic response answers should be used.

The invention is also based, in part, on the insight that modern computerized devices and systems often operate with the aid of one or more connected peripheral devices (peripherals). Such connected peripherals will generally be connected to the main part of the computerized system by various types of connections that allow signals and data to be transferred at least one way from the peripheral to the computerized system, or the computerized system to the peripheral. Such connections include direct electrical wire connections, as well as various types of wireless connections (e.g. Bluetooth® connections, Wi-Fi connections, and the like). Some peripherals are even connected by optical connections (e.g. infrared connections) or audio connections. These peripherals may be many different types of peripheral devices, such as various headsets, speakerphones, cameras, earphones, remote controls, and the like.

The invention is also based, in part, on the insight that there is often a predictable context in which a user may connect a given peripheral to the user's computerized systems. For example, in the case where the user's computerized system is a smartphone, the user may connect a first type of Bluetooth speakerphone to the smartphone while the user is driving in a car. The same user may connect a second type of Bluetooth headset to the smartphone while the user is out walking or exercising. The use may also frequently connect to other peripherals as well in other various predictable situations.

The invention is also based, in part on the insight of providing an improved automatic answering system that, at least in part, is able to adjust its automatic answering messages depending upon which peripherals are presently connected to the computerized system. More specifically, the invention teaches a novel type of automatic answering or response system that provides peripheral specific selection of various types of automated response messages.

Thus in some embodiments, the invention may be a software and computer processor mediated system and method of providing customized automated responses to different types of incoming electronic messages from various contact sources. Here the invention may be implemented in the form of software, which in turn is run on a computerized system such as a smartphone that is also capable of connecting to various peripherals, each with their own peripheral identification code.

Note that in this context, the peripheral identification code may be a Bluetooth™ peripheral device identification code, or other smartphone detectable peripheral device code, or alternatively may even be the electrical connection by which a particular device connects to the smartphone. Thus for example, a headphone or headset connecting via the smartphone's audio output (or input/output) jack can also be considered to have a peripheral identification code because the smartphone can determine by polling the status of the audio jack if a headphone or headset device is connected.

In some embodiments, the system may operate by merely identifying a class or type of peripheral, and will not need, for example, to distinguish between individual peripherals within a general class or type of peripheral.

The invention's software allows different automated responses to be assigned to different peripherals (often by way of different peripheral identification codes), so that the automated response can vary depending on which peripherals are connected to the computerized device. As previously discussed, this peripheral connection can be by either a wired or wireless (e.g. Bluetooth) connection. This disclosure will also discuss various prioritization schemes, such as "last peripheral connected selects the response message", as well as various ways in which different contact-specific automated responses may interact with various peripheral-specific automated responses.

Although the invention may be used in many situations, from a public safety perspective, the invention is particularly useful for preventing distracted driving. This is because it is common for automobiles to contain one or more automobile specific Bluetooth devices (either built directly into the car, or alternatively as part of car mounted after-market equipment, or worn by the driver in the form of a headset or earpiece which is kept in the vehicle). Thus in some embodiments, the invention makes use of the fact that close proximity to automobile associated Bluetooth peripherals is often an excellent indicator that the user is driving, and thus should not be distracted by various incoming messages.

DETAILED DESCRIPTION OF THE INVENTION

Abbreviation: Throughout this disclosure, the trademarked term Bluetooth® is used to denote the IEEE 802.15 standard for short-range wireless communications. However this term may also be read more broadly as teaching other types of bidirectional short range wireless communication links as well.

SMS is the abbreviation of "Short Message Service", a text messaging service frequently used for cell phones, smartphones and other devices.

MMS is the abbreviation of "Multimedia Messaging Service", an extension of SMS that is a standard way to send text and/or additional multimedia content (e.g. text, videos, pictures, ringtones etc.) between cell phones, smartphones, and other devices.

Other message types may include email, Google hangout messages, other social network messages, and the like.

Figure 1:
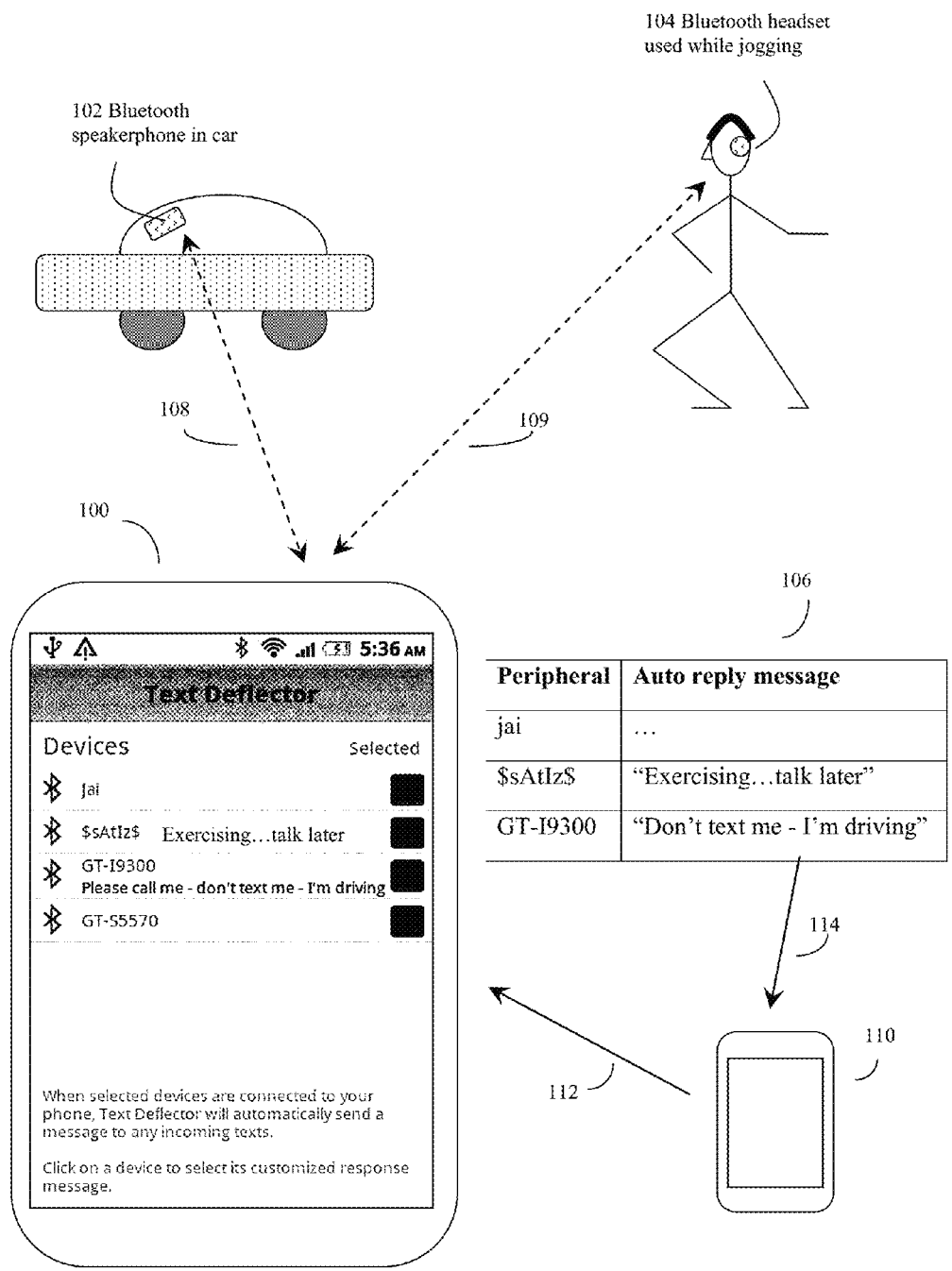
FIG. 1 shows a schematic overview of the invention.

FIG. 1 shows a schematic overview of the invention.

In FIG. 1, a computerized system or computerized device (100) is shown. This computerized system will be generally comprised of at least one processor, memory, software (such as operating system software), at least one long-range communications interface (often a wireless interface such as a 3G, 4G, or 5G cellular telephone and/or Wi-Fi transceiver), peripheral interface devices (such as a short range wireless Bluetooth transceiver, wire jacks for hard wired peripherals, and the like), and usually a user interface, such as a Graphical User Interface (GUI) that is capable of both displaying messages, and receiving user input. Examples of such computerized systems can include smartphones (e.g. Apple iPhones, Android smartphones, and the like), tablet computers, personal computers, or even embedded computers, such as computers embedded into vehicles and other devices.

The computerized system (100) is generally configured to be able to connect (e.g. exchange information with) to one or more peripheral devices, here exemplified by a car-mounted Bluetooth speakerphone (102), as well as a Bluetooth headset (104) typically worn by the user while exercising. Each peripheral device will generally either have its own peripheral identification code or other way by which the computerized system (100) can identify when that particular peripheral is attached to the system (100).

The computerized system (100) will also be running the invention's automatic response software. If the system (100) is a smartphone or a tablet computer, this automatic response software will often be loaded into the memory of system (100) as an "app".

Among other functions, which will be discussed, the invention's software will typically maintain, in device memory, an association between particular peripherals and particular auto reply messages. This memory stored peripheral—reply message association is symbolized by table (106).

Table (106) shows, for example, that one peripheral, such as $sAtIz$ (here assume that this is headset peripheral 104), which is associated with the auto reply message "Exercising . . . talk later". By contrast, another car mounted peripheral, such as GT-I9300 (here assume that this is peripheral 102) is associated with the auto reply message "Please call me—Don't text me—I'm driving".

The invention software is configured so that, in the event that say the car Bluetooth speakerphone peripheral (102), is connected (108) to the computer system (100), then the invention's software will detect this fact. As a result, when an outside contact (110) attempts to communicate with (100) by, for example, sending an SMS text message (112), the software will use the fact that the car Bluetooth speakerphone (102) is connected (108) to system (100) to deduce, using association (106), that the appropriate auto reply message to use is the driving specific automatic reply message "Please call me—don't text me—I'm driving" (114). The software will thus send out the above driving related automatic reply message.

By contrast, if instead the headset peripheral (104), which the user primarily uses during jogging is connected (109) to (100), then the system software (106) will determine that a different peripheral is connected. Here, assuming that the user has appropriately configured the system, the software will use association (106) to instead determine that the exercising type automatic reply message "Exercising . . . talk later" should be used to automatically reply to outside contact (100).

As will be discussed, this basic peripheral controlled auto response method can be modified in various ways. For example, in the event that multiple peripherals are connected at the same time, then some sort of priority scheme needs to be used in order to determine which peripheral should be used to generate the automatic response. Many different types of priority schemes are possible. In some embodiments, the user may be given configuration options that allow total control over this priority selection process. In other embodiments, at least as a default priority, often the last peripheral connected will be given the highest priority, and the automatic response associated with the last connected peripheral will be selected, until the user specifies otherwise and/or until the last connected peripheral is disconnected.

Similarly this basic peripheral controlled auto response scheme may, in some embodiments, apply to all incoming messages regardless of who the contact is (e.g. regardless of which person or organization calls). In other embodiments, at least certain contacts (e.g. boss, wife, friends, parents) may be given their own automatic response messages that can, again according to choice of override scheme, override or not override the peripheral associated automatic reply messages.

In general, any priority scheme for handling all permutations of peripherals and contacts is contemplated, and the software may be configured to allow the user total control over this priority scheme. In other embodiments, at least as a default to be used in the absence of explicit user priority instructions, certain more specific priority schemes may be used, and these will be discussed in more detail as follows below.

Note that although, as previously discussed, short range wireless connections to peripherals, such as the Bluetooth wireless protocol, are frequently used throughout this specification as examples of a connection scheme between a computerized system (100) and various peripherals, these examples are not intended to be limiting. Indeed any connection scheme that enables the system (100) to exchange information or signals with the peripherals is considered to be a valid connection scheme according to the invention. Thus, for example, even an analog earphone, plugged into an analog speaker jack, may be considered to be a peripheral that can be used to control an auto reply response message so long as the computerized system (100) can detect when that particular peripheral is connected, and when it is not.

The following figures and discussions focus on one particular embodiment of the invention, here in the form of a prototype app intended for a smartphone such as an Apple iOS smartphone or Android smartphone. Again, these discussions are not intended to be limiting.

Figure 2A:
FIG. 2A shows a screenshot of one embodiment of the invention's peripheral configuration menu.

FIG. 2A shows a screenshot of one embodiment of the invention's peripheral configuration menu. In this example, the various peripherals are called "devices", and these various devices all connect to the computerized system (here an Android Smartphone) via wireless Bluetooth™ connections.

Figure 2B:
FIG. 2B shows a screenshot of another embodiment of the invention's peripheral configuration menu, here showing a wide range of alternative Bluetooth peripherals that may be used to control the system's auto answer response messages. Here the auto-answer messages assigned to each peripheral are not shown.

FIG. 2B shows another embodiment of the invention's peripheral configuration menu, here showing a wide range of alternative Bluetooth peripherals that may be used to control the system's auto answer response messages. Here the auto-answer messages assigned to each peripheral are not shown.

Here, the list shows all currently connected Bluetooth devices, as well as other Bluetooth devices that were checked and previously connected, but which are not currently connected.

In an alternative embodiment, peripherals that connect by other methods, such as hardwire connections (e.g. via an analog audio connector jack) may also be shown on this screen.

FIG. 2B shows a screenshot of another embodiment of the invention's peripheral configuration menu, here showing a wider range of alternative Bluetooth peripherals that may be used to control the system's auto answer response messages. Here the auto-answer messages assigned to each peripheral are not shown.

Figure 2C:
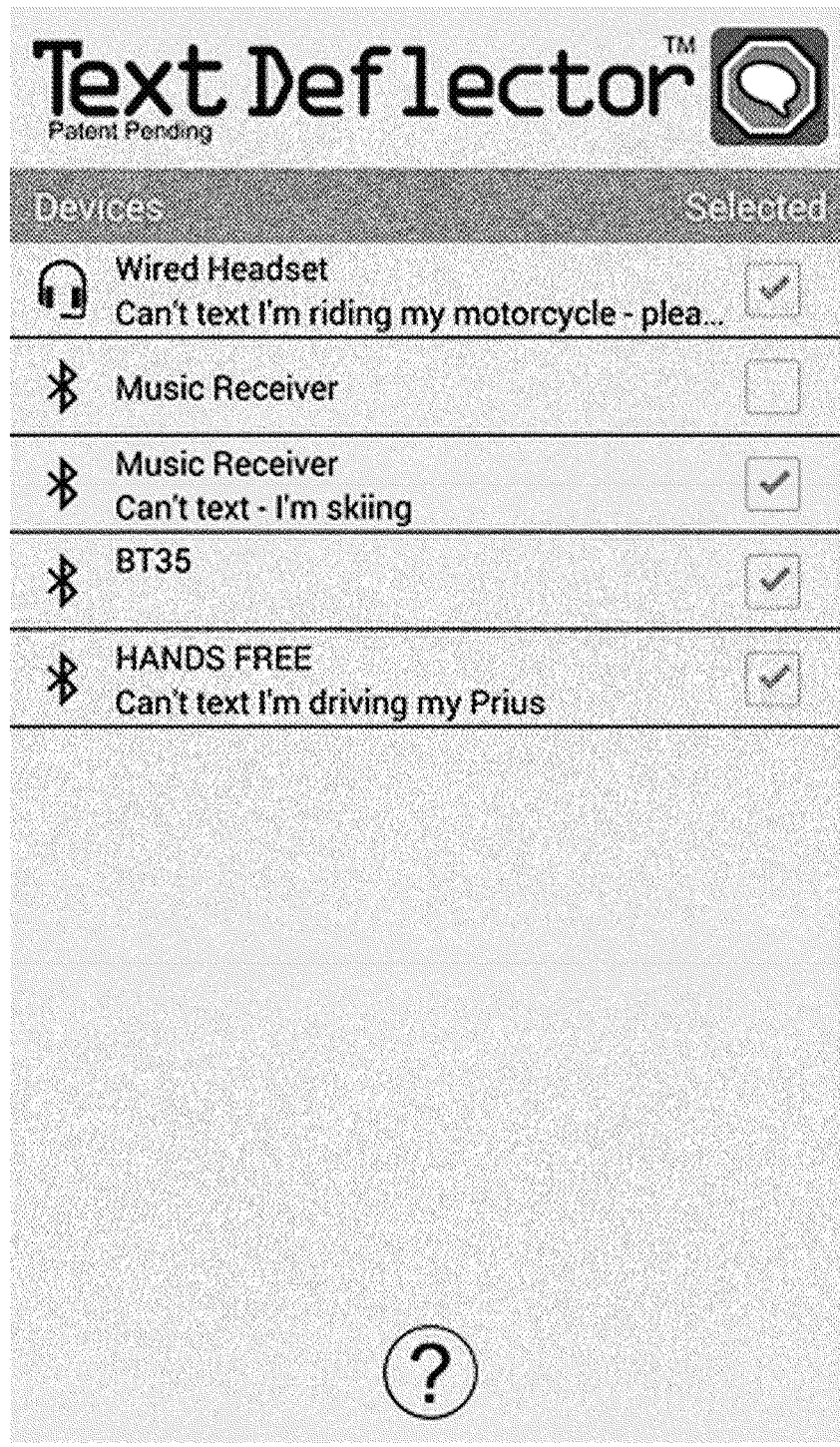
FIG. 2C shows a screenshot of the premium Android version of the product.

FIG. 2C shows a screenshot of an Android version of the product, in which the system enables the user to configure which devices, when connected, will trigger an automatic response to incoming messages. The screen also shows the various default messages that will be triggered when a particular peripheral is connected. Note that in this example, the user habitually uses his wired headset when he is on his motor cycle, habitually uses his Bluetooth Music Receiver when he is skiing, and habitually uses his automobile's (Toyota Prius) built in Bluetooth hands free receiver when he is driving.

Figure 3:
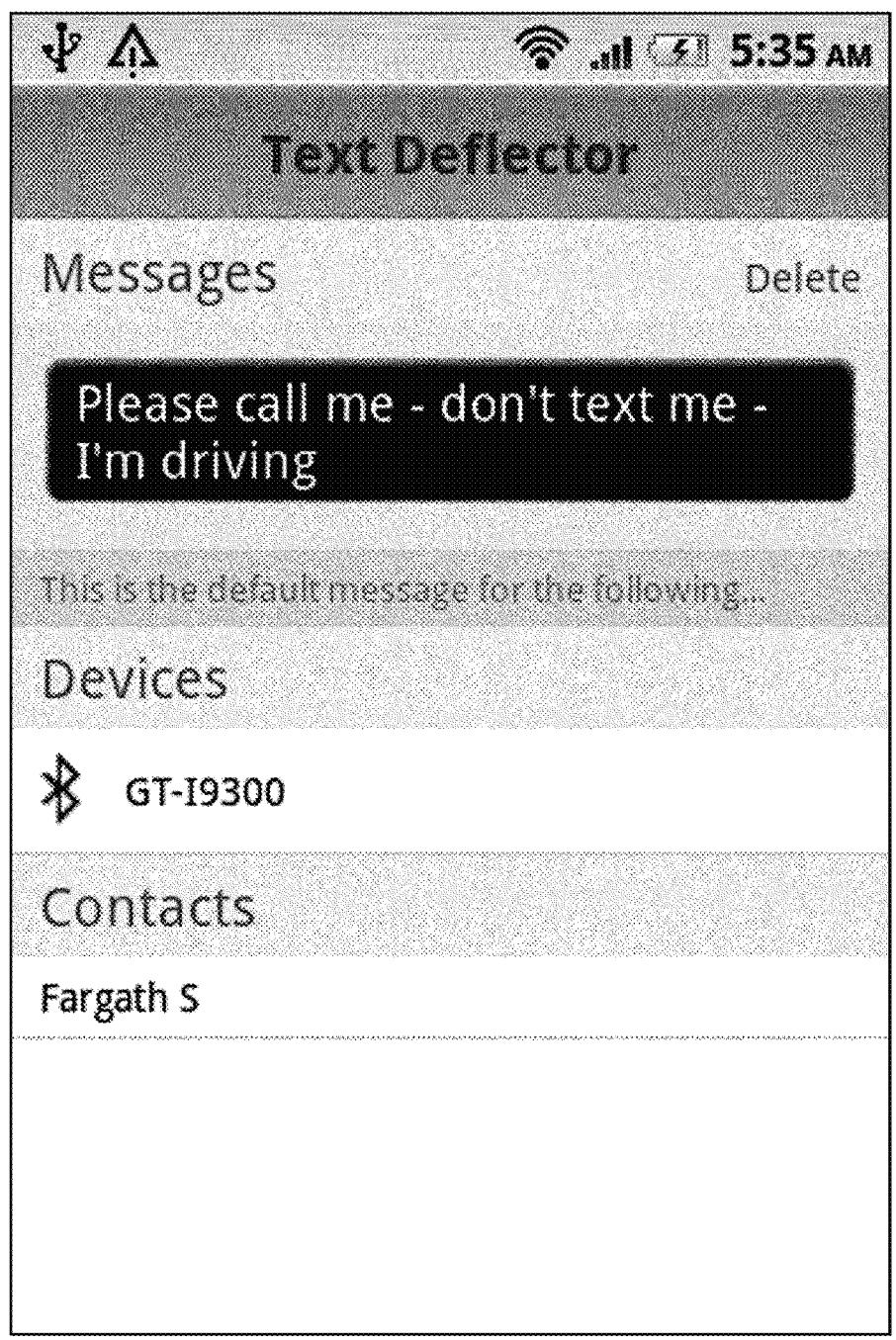
FIG. 3 shows a screenshot of one embodiment of the invention's user interface screen where the user can edit the auto answer message that the user wishes to link to a particular peripheral device.

FIG. 3 shows a screenshot of one embodiment of the invention's user interface screen where the user can edit the auto answer message that the user wishes to link to a particular peripheral device or contact. System default auto reply messages may also be shown on this interface screen.

In this scheme, when a user first informs the system that a new peripheral device is to be used for auto answering purposes, the system will then also provide a device message screen (shown in FIG. 3) to inform the computerized system which default auto answer message to use when that particular peripheral device is connected.

In this particular embodiment, where the computerized system is a smartphone with a touch sensitive display screen, to change a particular device auto answer message, the user may click (e.g. touch) the device's name. When the device next connects to the computerized system, the system can then set the current auto answer message to be the same as that particular device's auto answer message. That is, the system will use whatever message the user had previously entered into the "messages" screen in FIG. 3.

In this particular embodiment, which is oriented to auto responding to SMS text messages, to fit within SMS message length, and also to promote the system (at least for a free version) the user entered automatic answer message is limited to a total length of 136 characters, and 24 characters of this total length are further reserved for final non-editable advertising tagline in at least the freeware form of the invention. This tagline may optionally be removed or replaced with a user edited version in a paid version.

The user may also be given the option to further link the automatic response messages to other devices or other contacts. This may be done by configuring the system to provide a separate contact screen for this purpose, or by configuring the system to allow the user to alter the listing of these links below the edit box in the present screen. The user may also remove a previously entered automatic response message by blanking out the message by backspacing, using a delete button, or other method.

In some embodiments, because a particular automatic response message may be linked to more than one peripheral or more than one contact, it will be useful to remind the user of this fact when the user decides to edit a particular peripheral-linked automatic response. This sort of warning is shown in FIG. 4.

Figure 4:
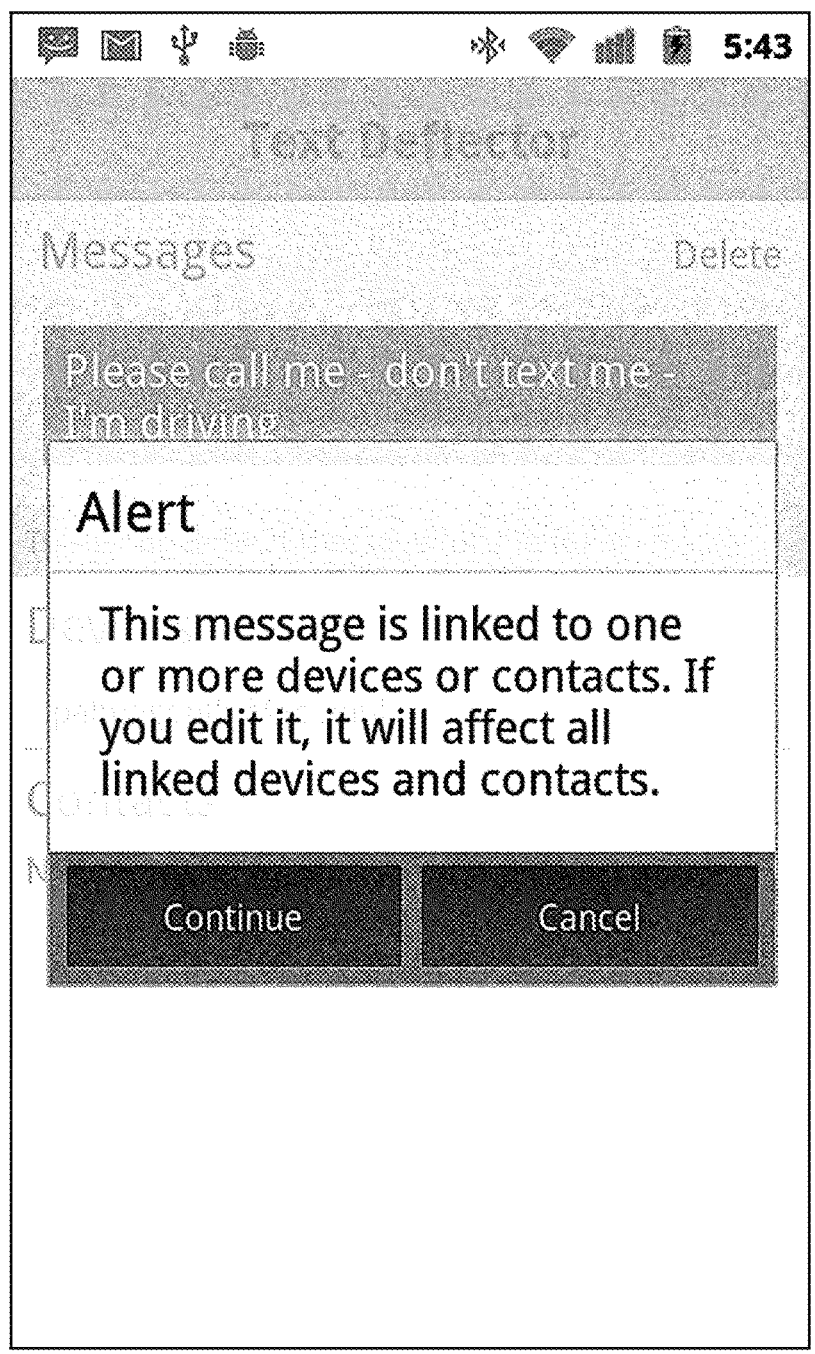
FIG. 4 shows a screenshot of one embodiment of a default message that the system is instructed to use whenever a particular peripheral is connected to the computerized device.

FIG. 4 shows a screenshot of a warning message that may be generated when the user attempts to edit an automatic reply message that has been associated with multiple peripherals, multiple contacts or a combination of contacts and/or one or more peripheral devices. Thus when opening and editing a peripheral linked automatic response message, if that particular peripheral automatic response message is also linked to any other peripheral or human contact, the system will show a popup alert warning the user to the effect that "This message is linked to one or more devices or contacts. If you edit it, it will affect all linked devices and contacts."

In this embodiment, after the user overrides the above (optional) warning, the use can then set the default auto answer message to be used when this particular peripheral is connected to the computerized system. Thus, for example, the user can configure the system so that if the user's smartphone (computerized system) detects that it is connected to the user's Bluetooth speaker phone (which is located in the user's automobile), the default auto answer message can be of the type: "Please don't text me, I'm driving".

The system can also be configured to be flexible, so that a previously set automatic answer message can be overridden by the user, such as by going to a messages screen (see FIG. 5A) and checking or entering in a different message automatic reply message. Alternatively, the user can also use a suitable control screen, such as the FIG. 5A messages screen, to go back and edit the message configuration screen such as shown in FIG. 3.

Figure 5A:
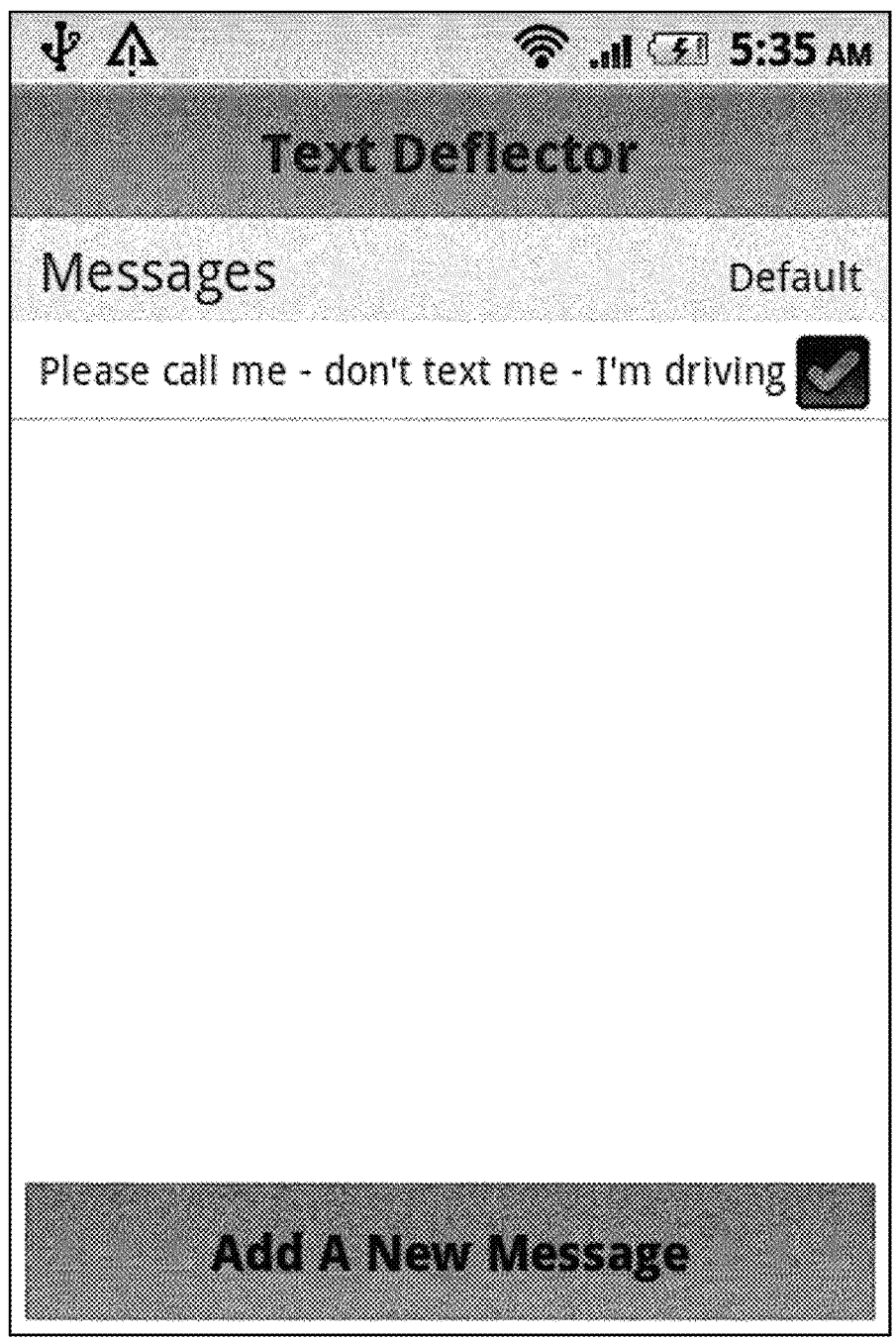
FIG. 5A shows a screenshot of one embodiment of an automated response message display screen that allows the user to easily pick and choose which automated response messages to set as the present default automated response message.

FIG. 5A shows a screenshot of an automated response message display screen that allows the user to easily pick and choose which automated response messages to set as the present default automated response message. Here the currently active default automatic response message is checked, and only one default has been presently entered into the system. However the user can enter other automatic responses messages via the "Add a New Message" command at the bottom of the screen. Once the user has added an additional message, the user can then select it (e.g. touch the appropriate touchscreen control) to make it active (i.e. set as an alternative current default message).

Figure 5B:
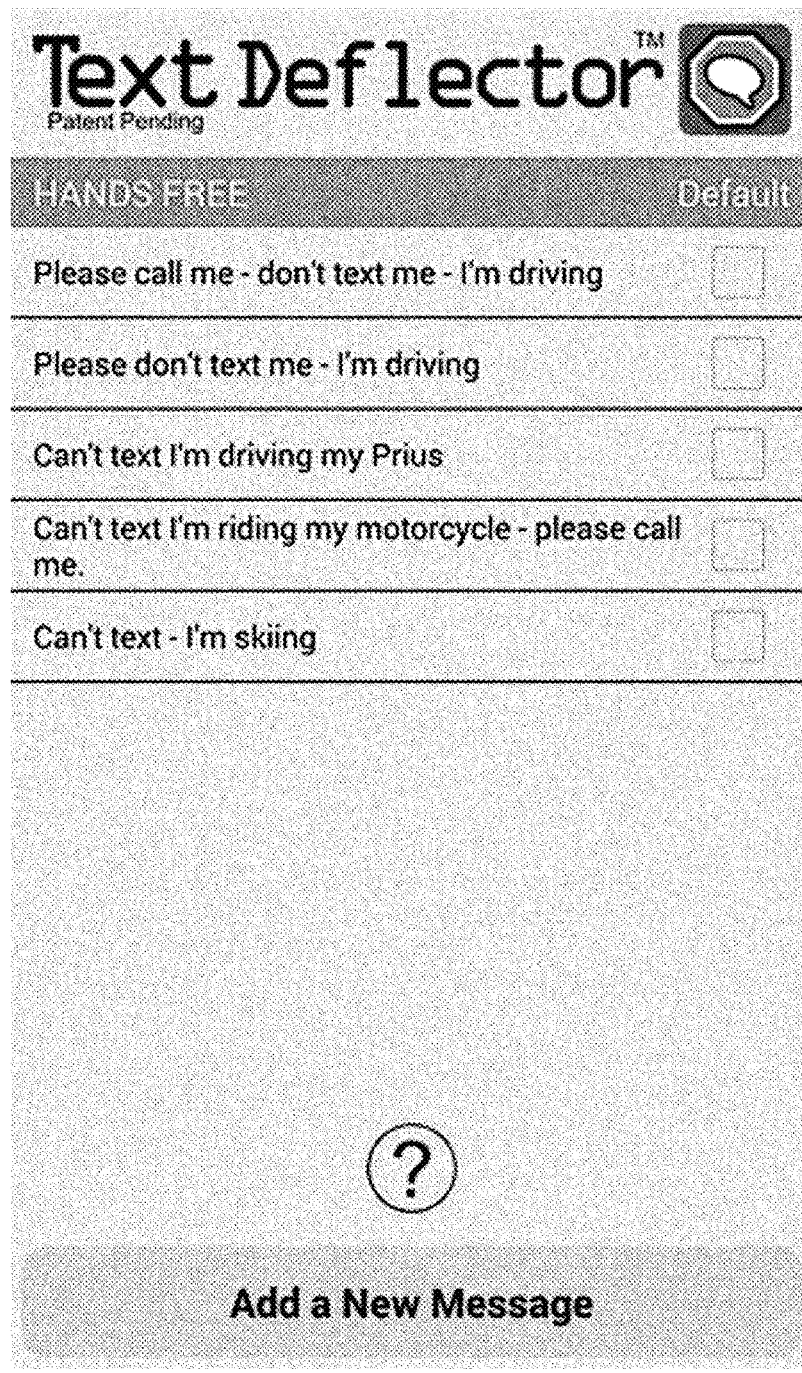
FIG. 5B shows a screenshot of the premium Android version of the product, in which the user is allowed to select among multiple different auto response messages.

FIG. 5B shows a more populated automated message response display screen that allows the user to configure which, among various previously entered automatic response messages, the user wants a particular device (here the user's Toyota Prius' built in Bluetooth hands free speakerphone) to use as the default automatic response message.

Figure 6:
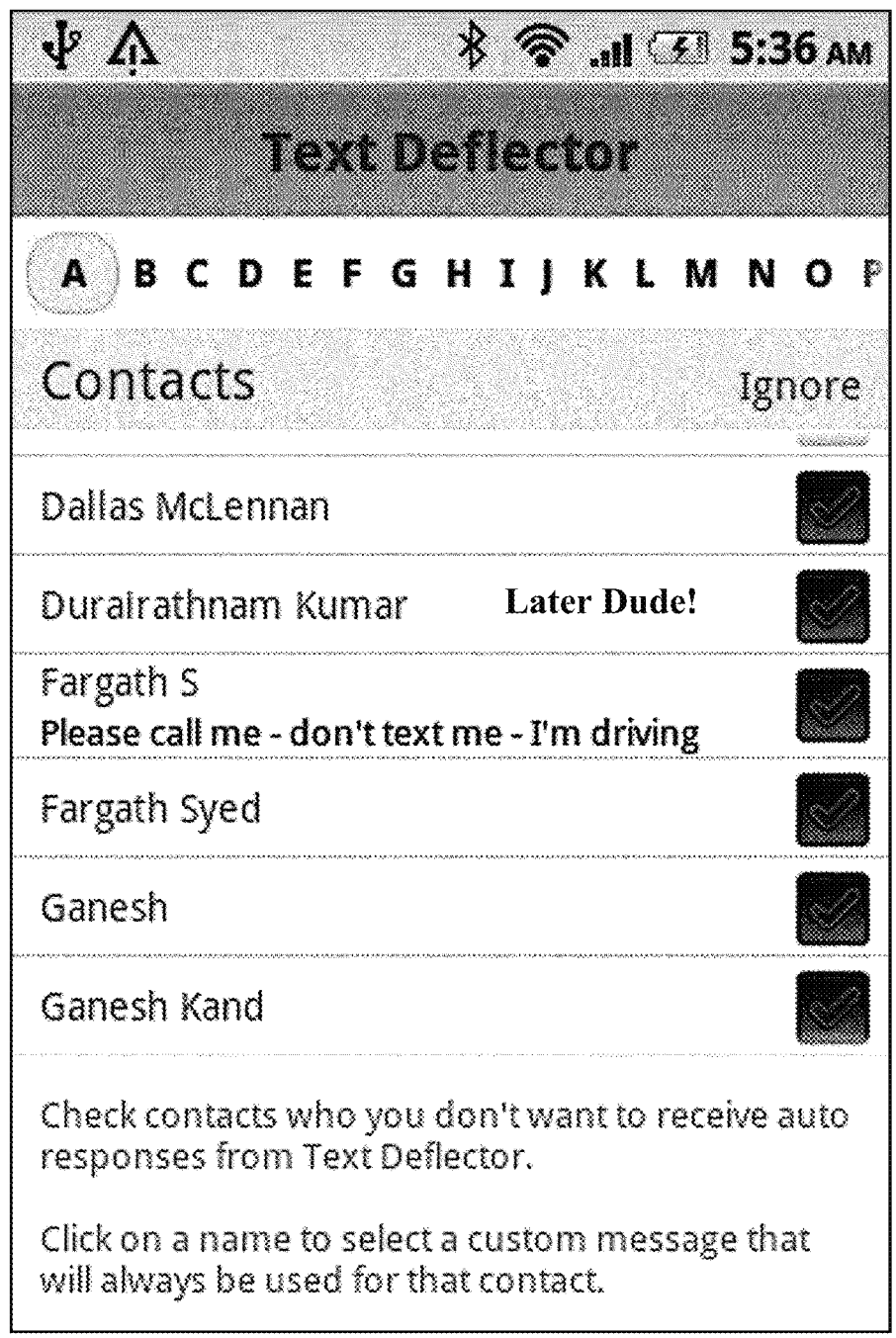
FIG. 6 shows a screenshot of one embodiment of a user's contact list, in which each individual contact may either be blacklisted from receiving automated message responses; or alternatively also be given contact specific customized automated response message that in turn will vary according to which particular peripheral is connected to the computerized device.

FIG. 6 shows a screenshot of the user's contact list. In some embodiments, each individual (and usually human or business) contact may also be given contact specific customized automated response message that in turn can be configured to vary according to which particular peripheral is connected to the computerized device. In other embodiments, the system can be configured so that the type of connected peripheral determines if the automated response message will be transmitted or not.

As FIG. 6 shows, in some embodiments the system may list all contacts in the user's address book, and optionally select certain contacts to add to a "do not auto respond to texts from this contact" blacklist. In some embodiments, the user may also select (e.g. click on) a particular contact to set an override automatic response message that should be used to respond to that particular contact. Such contact specific override responses may then, for example, override any peripheral specific default automatic response that would be used otherwise.

As an example, an employee may have set an informal and peripheral specific "Don't bug me Bro' I'm driving" automatic text response message that will normally operate whenever the employee's smartphone detects that the employee's smartphone is connected to the employee's automobile's Bluetooth speakerphone.

However if the employee may also set various contact specific overrides to this so that if the employee's smartphone detects from the contact list that it is the employee's boss or parents that are texting while the employee's smartphone is connected to the automobile, the system will then select a more formal text response such as: "Presently driving—will respond quickly when safe".

Thus in this scheme, a contact list specific automatic response may be set to always override a generic peripheral specific automatic response. Other prioritization schemes may also be used.

Note that although in this example, the contact list selected automatic response will override the peripheral device specific automatic response, the peripheral specific automatic response trigger may be set to still be operative. That is, the system may be configured so that a particular contact list selected automatic response will only be selected if a contact (e.g. text message) is received from that particular contact AND the system also detects that the particular peripheral associated with generating a "driving" trigger is present. Alternatively the system can be configured so that a response is only sent if a peripheral is connected, or if manual mode (manual override) is active.

Thus in general, the system may use the presence or absence of specific peripherals as a trigger to transmit certain pre-selected automatic responses (or not). Which pre-selected automatic responses are then transmitted in response to that trigger may then depend on which contact generated the incoming message (e.g. activated a trigger) and then on the user set logic as to which automatic response to send out (e.g. the contact specific automatic response for that trigger, or a default response for that trigger) to use.

There is thus a potential matrix of contact and peripheral automatic response messages for all combinations of peripherals and contacts, as is shown in Tables 1A and 1B below:

TABLE 1A

Embodiment 1

| | Peripheral 1 (car) | Peripheral 2 (headset) | No peripheral default |
|---|---|---|---|
| Contact A (boss) | "Will respond soon" | "Working hard boss" | "Call me later" |
| Contact B (friend) | "Later dude" | "Call me bro" | "Sleeping or dead" |
| Contact C (ex-girlfriend) | "bug off" | "bug off" | "bug off" |
| All others (default) | "Driving . . . " | "Busy . . . " | "Can't respond now" |

TABLE 1B

Embodiment 2

|  | Peripheral 1 (car) | Peripheral 2 (headset) | No peripheral default |
|---|---|---|---|
| Contact A (boss) | "Working hard boss" | "Working hard boss" | "Working hard boss" |
| Contact B (friend) | "Call me bro" | "Call me bro" | "Call me bro" |
| Contact C (ex-girlfriend) | "bug off" | "bug off" | "bug off" |
| All others (default) | "Driving . . . " | "Busy . . . " | "Can't respond now" |

In some embodiments, peripherals with no pre-set custom messages will be given a default message.

Alternatively, the matrix of automatic responses messages shown in table 1A or 1B may be set to give no automatic response at all if no peripherals are connected.

Figure 7:
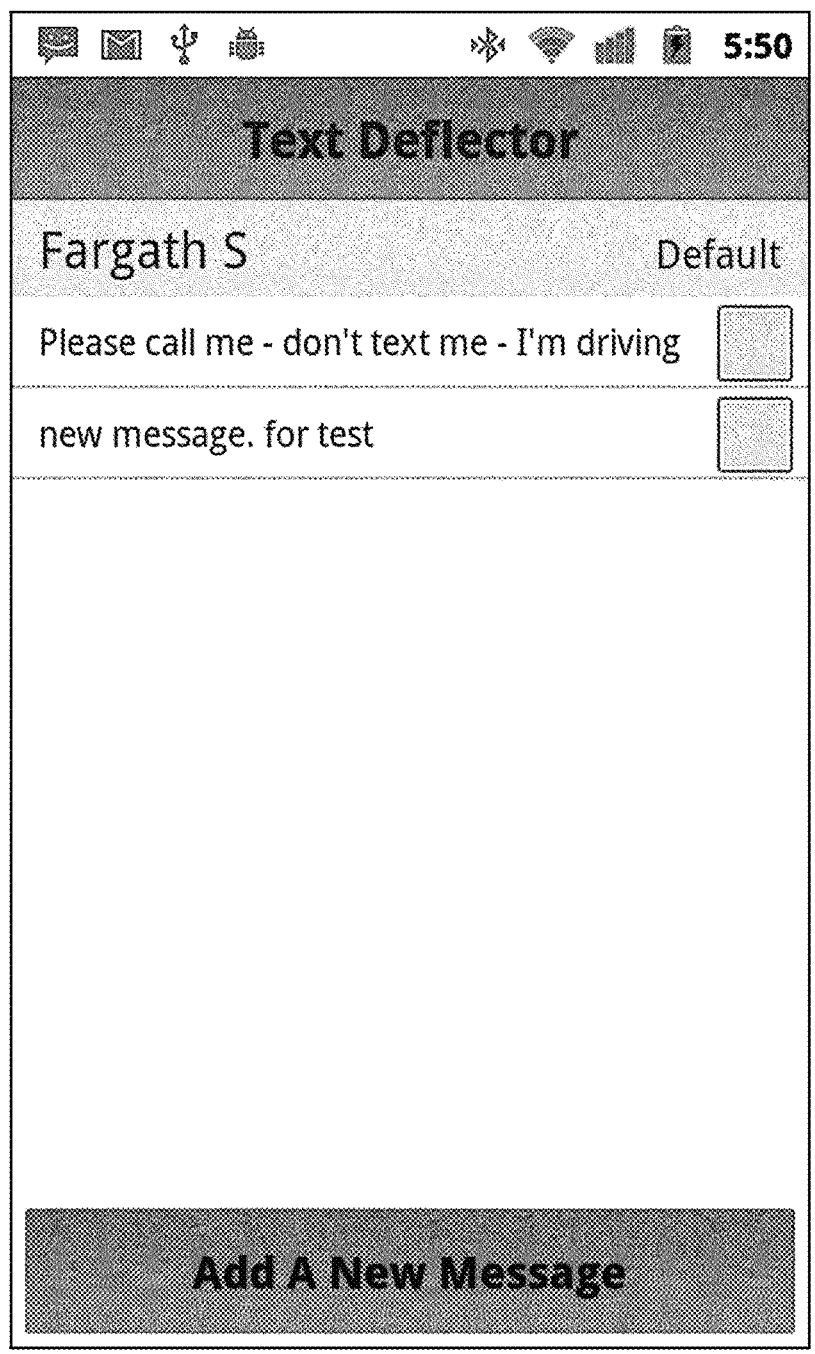
FIG. 7 shows how, in one embodiment, the user can, for each individual contact, select or edit a particular customized automated response message that will be used either regardless of which particular peripheral is connected to the computerized device, or according to which particular peripheral is connected to the computerized device.

FIG. 7 shows how, in some embodiments, the user can, for each individual contact, edit a particular customized automated response message that will be used according to which particular peripheral is connected to the computerized device.

In some embodiments, after selecting a particular individual or organization from the contact list, the user can then edit the automatic response to be selected for that particular contact. This is shown in FIG. 7, which shows how the user can set the message to be used when responding to texts from this contact. As before, the system may generate an optional warning message if the particular message being edited is also linked to other peripherals or contacts.

In addition to the various app screens shown here, an app or other software according to the invention may have other user interface screens as well. For example, such an app or other software may also have a home screen or general configuration screen. This home or configuration screen may have, for example, various additional displays and functions such as:

A checkbox/on-off control to turn the app on (where it will usually then run in the background) or off.

Click-on headings to allow the user to quickly jump to other app screens with corresponding names or functionality that matches the heading.

Click-on upgrade notices. Here, for example, if the app is being distributed as different free versions, as well as premium versions with more functions, the user can use an upgrade option to jump to another app screen that describes various extra features that may be provided by a premium version of the app.

A showing of various default system settings, such as showing at least the first line of the app's current default automatic response message.

Use examples:

In the following examples, assume that the computerized system is a smartphone such as an Apple iPhone or Android smartphone, the user has downloaded and installed an app that implements the invention's methods, and that the user is then using the system to auto respond to incoming Short Message Service (SMS) messages (text messages). Thus the invention is being implemented in the form of an app running on a smartphone (e.g. as software running on the smartphone's processor or processors). Here the invention will be referred to as the "application" or "app" for short.

Using Bluetooth connected peripherals as a specific example; the computerized system (smartphone) may be configured to respond to an incoming SMS message as follows:

Case 1: application (app) is not active—nothing (no auto response) happens

Case 2: application is active, but none of the selected Bluetooth (BT) peripheral devices is in range—nothing happens (alternatively a default no-peripheral auto response may be provided).

Case 3: application is active and one or more of the selected Bluetooth peripheral devices is in range and/or connected, and the SMS sender is also listed as a contact in the smartphone's directory with a contact specific response message assigned—then the system will auto reply with the user assigned contact specific message.

Case 4: application is active and one or more of the selected BT devices is in range and/or connected and the SMS sender is unknown or a contact with no response message assigned—then the system will auto reply with current active peripheral specific message.

In this context, the "current active message" may be defined as follows:

Initially, upon setup, the first auto reply message entered by the user (e.g. —"message 1") can be initially selected by the system to be the current active message (at least until the user changes this), and the text of this first message can be the text of the current active message.

As the user adds one or more additional custom messages (and optionally checks off these messages), whatever auto reply message the user selects will be used by the system as the current active message.

If a selected peripheral, such as a Bluetooth device peripheral comes into range (i.e. connects with) of the computerized device, and if this particular peripheral does not have a default message set yet, then the fact that the peripheral is now communicating with the computerized device will have no effect on the auto reply message. In this case the current active auto reply message will remain unchanged from whatever the last active message was.

Alternatively, the system may be configured so that if no peripherals are connected, the invention's automatic response software may be bypassed, and instead the computerized system's generic default automatic reply message (assuming that one has been previously specified) may be provided instead. However if a selected peripheral with a previously specified default auto reply message is connected to the computerized device, then the peripheral specific auto reply message then becomes the current active message.

Similarly, if a second (or third) selected peripheral with a previously specified auto reply message is connected to the computerized device, it may be convenient (as previously discussed) to configure the invention software so that the auto reply associated with the last connected peripheral is chosen as the current active message. Alternatively, and also as previously discussed, the invention may allow the user to configure a peripheral priority order in which the auto reply message associated with the peripheral with the highest priority is automatically chosen as the current active message.

To change the current active auto reply messages, the user may also view a message configuration screen, such as FIG. 5, and select a different auto reply message to be the current active auto reply message.

In some "last connected peripheral device controls" type embodiments, a peripheral, upon connection with the computerized device (e.g. smartphone) will set the active auto reply message upon connection (i.e. coming within range if the peripheral is a Bluetooth connected peripheral).

However in these embodiments, it is the act of peripheral connection itself that determines the auto reply. That is, the continued connection of previously connected peripherals may not control the status of the active auto reply message, because the auto reply associated with the last connected peripheral dominates.

Even here, of course, the user can always change the active auto reply message manually by simply bringing up the list of messages (see FIG. 5) and setting another message as the currently active auto-reply message.

Pseudo Code Examples

In the following examples, certain aspects of the function of smartphone app software that implements certain embodiments of the invention are shown using pseudo code. Note that these pseudo code examples primarily focus on the selection of the current response message, rather than on details of the response mode activation process.

```
// $message should persist between sessions and reboots
global $message="Please call me—don't text me—I'm
driving—Sent from <device's phone number>by Text
Deflector"; // init on app install only
device:: on_connect( ) {
    if ($self->linked_message)
    $message=$self->linked_message;
}
device:: on_disconnect( ) {
    if ($self->linked_message and $message $self->
linked_message)
    //Fall back to global default message;
    $message=$messages->default;
}
controller::messages_screen::on_check( ) {
    //This is the main Messages screen (not the device or
contact select variant)
    if (!$self->device and !$self->contact)
    $message=$self->messages->selected;
    //This is the Messages screen for a specific Contact
    elseif ($self->contact)
    $self->contact->linked_message=$self->messages->se-
        lected;
    //This is the Messages screen for a specific Device
    elseif ($self->device)
    $self->device->linked_message=$self->messages->se-
        lected;
}
sms::on_receive( ) {
    if ($self->sender->linked_message)
    $self->reply($self->sender->linked_message)
    else
    $self->reply($message);
}
```

Subsequent Publication and Making Available to the Public

On Jul. 20, 2013, the inventors, under the name of "Suite B Media Inc." published a first version of the invention, entitled Text Deflector as an Android app on the Google Play store. They also publicized the invention on their Twitter feed at: https://twitter.com/textdeflector On Sep. 1, 2013, the inventors published a YouTube video describing the Text Deflector system in operation as "Text Deflector—The Automated Autoresponder" at: https://www.youtube.com/watch?v=hucE17dFvJc On Nov. 26, 2013, the inventors published a description of the improved version of the invention at http://www.bikeland.org/news-story.php?newsID=74286.

This press release stated:

"Announcing Text Deflector 2.0 (www.textdeflector.com), the smart phone app designed to provide a safer driving environment for everyone. Text Deflector is a free app (with no ads) that's designed to take the impulse to respond to texts away from drivers so they can focus on the task at hand . . . driving safely.

Text Deflector's patent pending technology works by sensing and linking to your in-car handsfree device (Bluetooth or wired headset) and automatically responds for you without any user input whatsoever to any incoming texts. Text Deflector notifies the sender that the driver is unavailable and optionally requests that the sender call instead.

Text Deflector 2.0 not only responds to SMS (text) messages while you're driving, now it will also respond to WS (picture and video) messages so you don't get distracted by any pictures sent to you when you're traveling down the Interstate."

"This is an app that should come pre-installed in every phone for the safety of the driving community," says Suite B Media's director of marketing, Loralee Fultz (Hajdu). "Text Deflector is simple to use—just launch the app and assign it to any hands-free device and it's ready to go."

The newer 2.0 version of the application was described as having the new features:

Responds to both SMS & MMS

System Tray Icon shows when App is active

Flood Control Filter—stops responding to repeated texts

Ignores Unknown Numbers and new Check All Contacts option

Maintains a record of auto responses

All New Interface/Look

Help and FAQ

On Dec. 17, 2013, the inventors then published an upgraded 2.0 version of Text Deflector on the Google play store.

As described on the Google play store, Test Deflector 2.0 was described as:

"Text Deflector 2.0 automatically responds to your incoming texts (both SMS and WS) while you're driving and does it safely, without any user input. Text Deflector works by sensing and linking to your in-car handsfree device (Bluetooth or wired headset) and automatically responds to any incoming texts, notifying the sender that the driver is unavailable.

No data is collected, GPS services are not used, and there's no additional drain on your battery."

The inventors further described the system as being completely automatic, not locking the user to a service provider or carrier, and sensing your peripheral devices automatically with no manual input. Other advantages listed were that the system was not GPS based or motion based, maintains user privacy, and allows users to import contacts for customization. Additional advantages are that the system does not cause additional battery drain.

A premium (paid for) version of Text Deflector also allows users to provide custom response messages, select multiple paired Bluetooth devices, assign a custom message to each Bluetooth device, and assign a custom message to each of the user's contacts. The premium version also offers a manual mode that could be enabled via a timer (useful if a connected peripheral is not available).

Preventing Distracted Driving

In some embodiments, the invention may also be a method of using the connection status of a Bluetooth peripheral to reduce the risks of distracted driving. Here, the invention operates by managing auto response replies to Smartphone incoming messages while the Smartphone's user is driving. As usual, these Smartphones will generally be equipped with at least one computer processor, memory, display, cellular network transceiver, Bluetooth transceiver, Smartphone software (e.g. Android, iOS, Blackberry, Windows mobile software, and the like), as well as the invention's automatic response software.

In this embodiment, the peripheral will generally be a Bluetooth peripheral that is normally associated with the vehicle that the user is driving. Although this Bluetooth peripheral may be a built-in automobile Bluetooth peripheral, other options are also possible. Here, for example, Bluetooth peripherals that are normally kept in the vehicle, such as visor mounted Bluetooth speakerphones, after-market Bluetooth GPS devices, and the like may also be used. As is standard for Bluetooth peripherals, each Bluetooth device will have its own peripheral identification code.

Here, when the user enters the vehicle, the Smartphone will detect the presence of various vehicle associated Bluetooth peripherals, and form a wireless Bluetooth connection with them. The invention's software can detect this connection, determine that a vehicle associated Bluetooth device has been connected using the peripheral identification code, and assign at least one Bluetooth vehicle associated peripheral linked automatic reply to this at least one Bluetooth peripheral identification code. This can be saved in memory.

Thus when a particular vehicle associated Bluetooth peripheral is wirelessly connected to the Smartphone, the invention's automatic reply software will use the vehicle associated Bluetooth peripheral's peripheral code to retrieve that particular automatic reply from memory. Thus when in response to incoming messages (e.g. SMS messages, MMS messages) the system can then retrieve the relevant automatic reply form memory, and use it to automatically respond to the particular incoming message.

The system can also be configured to configure automatic replies to other types of incoming messages as well, such as incoming video messages (e.g. FaceTime calls, Google Duo calls, and the like).

Silent operation: Although the following silent operation mode can be used for many different embodiments of the invention, it will often be desirable to further configure the automatic reply software to mute sounds produced by the Smartphone in response to various incoming messages and/or the various automatic replies when the system determines that the user may be driving.

Disabling autoresponse/ignoring certain incoming messages: Some telecommunications service providers routinely provide "new voicemail received" notices. Although some services routinely label these "new voicemail received messages" with the SMS identification or other identification of the caller that provided the voicemail, others do not. Other services, for example, label these "new voicemail received messages" with the service provider's set ID.

In order to have the invention distinguish between these two types of situations, it can be useful to further configure the system to check incoming messages versus a defined a text string or pattern. If this defined text string or pattern is detected, the system can be configured to automatically disable the system's auto response functions for these types of incoming messages. So, for example, if the incoming message contains key terms such as "voicemail", then the system can be instructed to ignore the incoming message, rather than to auto respond to the message.

Use as a Standard Part of a Smartphone Operating System

Although, in this disclosure, the various embodiments disclosed herein have been in the form of aftermarket, user installed, apps, in other embodiments, the methods described herein may instead be implemented as part of the standard smartphone operating system. In this later embodiment, the invention's features can thus be automatically provided for all smartphones using these operating systems. Because of the major burden that distracted driving places on society in the form of loss of life and injury, the invention could in turn help save lives if it was made a standard component of a smartphone OS.

Trademarks: Bluetooth® is a registered trademark of the Bluetooth SIG, Inc.

The invention claimed is:

1. A method of using peripheral connection status to select between a plurality of different active auto response replies to incoming messages on a computerized system, said method comprising:
   obtaining a computerized system, and at least one peripheral capable of connecting with said computerized system;
   said computerized system comprising at least one processor, memory, at least one wireless network transceiver, computerized system software and automatic reply software running on said at least one processor;
   each said at least one peripheral having a peripheral identification code that is individually identifiable by said computerized system when said at least one peripheral is connected to said computerized system;
   using said automatic reply software and said at least one processor to assign a plurality of peripheral linked different active automatic replies to incoming messages to at least one peripheral identification code, and storing said plurality of peripheral linked different active automatic replies to incoming messages in said memory;
   wherein when said at least one peripheral is connected to said computerized system, said automatic reply software will determine said at least one peripheral's peripheral code, and use said at least one peripheral identification code to select and retrieve at least one peripheral linked different active automatic reply to incoming messages from said plurality of peripheral linked different active automatic replies to incoming messages from said memory; and
   wherein in response to an incoming message obtained from said transceiver, using a selected and retrieved at least one peripheral linked different active automatic reply to incoming messages to automatically respond to said incoming message.

2. The method of claim 1, wherein said computerized system software or said automatic reply software further comprise a list of at least one communications contacts;
   further assigning at least one contact automated reply and a contact priority to at least one contacts on said list of at least one communications contacts;
   assigning a peripheral priority to said at least one peripheral;
   determining a relative priority between said peripheral linked different active automatic replies and contact assigned automated replies;
   and using said relative priority to determine if an incoming message from a contact on said list of at least one communications contacts should be automatically answered by either said peripheral linked different active automatic reply or said contact assigned automated reply.

3. The method of claim 1, wherein said computerized system is a smartphone, tablet computer, personal computer, telephone answering system, embedded computerized device, or vehicle embedded computerized device; and wherein either said peripheral connects to said computerized system using a wire connection or said peripheral connects to said computerized system using a wireless connection.

4. The method of claim 1, wherein said at least one peripheral linked different active automatic reply to incoming messages differs according to a contact that sent said incoming message, and a peripheral code of the peripheral last connected to said computerized system.

5. The method of claim 1, wherein said method is further used to help prevent distracted driving;
   wherein said at least one peripheral is a vehicle associated peripheral;
   wherein said computerized system is a smartphone; and
   wherein when said smartphone is brought in close proximity with said vehicle associated peripheral, said automatic reply software automatically detects said vehicle associated peripheral, and automatically configures said smartphone to automatically respond to at least one incoming message with a response message that is customized for an originator of said at least one incoming message.

6. The method of claim 1, wherein said incoming message is any of an SMS message, an MMS message with picture or video content, or other type of incoming video content.

7. The method of claim 1, wherein said computerized system is a smartphone, and wherein said peripheral connects to said smartphone using either a wire connection or a wireless connection.

8. The method of claim 7, further used to reduce risk of distracted driving by managing auto response replies to Smartphone incoming messages while a user of said Smartphone is driving.

9. The method of claim 1, wherein said at least one peripheral having an identification code that is individually identifiable by said computerized system is chosen from a plurality of different peripherals, each peripheral having a different identification code that is individually identifiable by said computerized system;
   further using said automatic reply software and said at least one processor to assign a plurality of peripheral linked different active automatic replies to incoming messages to said plurality of different peripherals, and storing said plurality of peripheral linked different active automatic replies to incoming messages in said memory;
   wherein said peripheral linked different active automatic reply to incoming messages varies depending upon which of said plurality of different peripherals are connected to said computerized system.

10. A computerized system configured to use peripheral connection status to select between a plurality of different active auto response replies to incoming messages to said system, comprising:
   a computerized device, and at least one peripheral capable of connecting with said computerized device;
   said computerized device comprising at least one processor, memory, at least one wireless network transceiver, computerized system software and automatic reply software running on said at least one processor;
   each said at least one peripheral having a peripheral identification code that is individually identifiable by said computerized device when said at least one peripheral is connected to said computerized device;
   wherein said automatic reply software and said at least one processor are configured to assign a plurality of peripheral linked different active automatic replies to incoming messages to at least one peripheral identification code, and store said plurality of peripheral linked different active automatic replies to incoming messages in said memory;
   wherein said automatic reply software and said at least one processor are configured so that when said at least one peripheral is connected to said computerized system, said automatic reply software determines said at least one peripheral's peripheral code, and uses said at least one peripheral identification code to select and retrieve at least one peripheral linked automatic reply from said plurality of peripheral linked different active automatic replies to incoming messages from said memory; and
   wherein said automatic reply software and said at least one processor are configured so that in response to an incoming message obtained from said transceiver, said automatic reply software and said at least one processor use a selected and retrieved at least one peripheral linked different active automatic reply to incoming messages to automatically respond to said incoming message.

11. The system of claim 10, wherein said computerized system software or said automatic reply software are further configured to comprise a list of at least one communications contacts;
   wherein said automatic reply software and said at least one processor are further configured to assign at least one contact automated reply and a contact priority to at least one contacts on said list of at least one communications contacts;
   wherein said automatic reply software and said at least one processor are further configured to assign a peripheral priority to said at least one peripheral, and to determine a relative priority between said peripheral linked automatic replies and contact assigned automated replies;
   wherein said automatic reply software and said at least one processor are further configured to use said relative priority to determine if an incoming message from a contact on said list of at least one communications contacts should be automatically answered by either said peripheral linked automatic reply or said contact assigned automated reply.

12. The system of claim 10, wherein said computerized device is a smartphone, tablet computer, personal computer, telephone answering system, embedded computerized device, or vehicle embedded computerized device.

13. The system of claim 10, wherein said peripheral connects to said computerized device using a wire connection.

14. The system of claim 10, wherein said peripheral connects to said computerized device using a wireless connection.

15. The system of claim 10, wherein said at least one peripheral linked different active automatic reply to incoming messages differs according to a contact that sent said incoming message, and a peripheral code of the peripheral last connected to said computerized system.

16. The system of claim 10, wherein said system is further configured to help prevent distracted driving;
   wherein said at least one peripheral is a vehicle associated peripheral;
   wherein said computerized device is a smartphone; and
   wherein said automatic reply software and said at least one processor are further configured that when said smartphone is brought in close proximity with said vehicle associated peripheral, said automatic reply software automatically detects said vehicle associated peripheral, and automatically configures said smartphone to automatically respond to at least one incoming message with a response message that is customized for an originator of said at least one incoming message.

17. The system of claim 10, wherein said incoming message is any of an SMS message, an MMS message with picture or video content, or other type of incoming video content.

18. The system of claim 10, wherein said computerized device is a smartphone, and wherein said peripheral connects to said smartphone using either a wire connection or a wireless connection.

19. The system of claim 18, wherein said system is configured to manage auto response replies to Smartphone incoming messages while a user of said Smartphone is driving, thereby reducing a risk of distracted driving.

20. The system of claim 10, wherein said at least one peripheral having an identification code that is individually identifiable by said computerized system is chosen from a plurality of different peripherals, each peripheral having a different identification code that is individually identifiable by said computerized system;
   wherein said automatic reply software and said at least one processor are further configured to assign a plurality of peripheral linked different active automatic replies to incoming messages to said plurality of different peripherals, and to store said plurality of peripheral linked different active automatic replies to incoming messages in said memory;
   wherein said peripheral linked different active automatic reply to incoming messages varies depending upon which of said plurality of different peripherals are connected to said computerized system.

* * * * *